United States Patent
Corbellini et al.

(10) Patent No.: US 9,622,264 B2
(45) Date of Patent: Apr. 11, 2017

(54) METHOD FOR ACCESSING A TRANSMISSION CHANNEL IN A WIRELESS COMMUNICATION NETWORK WITH A CONTENTION WINDOW

(71) Applicant: Commissariat à l'Energie Atomique et aux Energies Alternatives, Paris (FR)

(72) Inventors: Giorgio Corbellini, Zurich (CH); Emilio Calvanese Strinati, Grenoble (FR)

(73) Assignee: COMMISSARIAT A L'ENERGIE ATOMIQUE ET AUX ENERGIES ALTERNATIVES (FR)

( * ) Notice: Subject to any disclaimer, the term of this patent is extended or adjusted under 35 U.S.C. 154(b) by 208 days.

(21) Appl. No.: 14/370,346

(22) PCT Filed: Jan. 2, 2013

(86) PCT No.: PCT/EP2013/050012
§ 371 (c)(1),
(2) Date: Jul. 2, 2014

(87) PCT Pub. No.: WO2013/102628
PCT Pub. Date: Jul. 11, 2013

(65) Prior Publication Data
US 2014/0334423 A1  Nov. 13, 2014

(30) Foreign Application Priority Data

Jan. 2, 2012  (FR) .................................. 12 50014

(51) Int. Cl.
*H04B 7/212* (2006.01)
*H04J 3/16* (2006.01)
(Continued)

(52) U.S. Cl.
CPC ....... *H04W 74/08* (2013.01); *H04W 52/0216* (2013.01); *H04W 52/0219* (2013.01); *H04W 74/0808* (2013.01); *H04W 84/18* (2013.01)

(58) Field of Classification Search
CPC ......... H04L 47/10; H04L 47/30; H04L 47/11; H04L 47/12; H04L 47/15; H04L 47/2441; H04L 47/70; H04L 2012/5631
(Continued)

(56) References Cited

U.S. PATENT DOCUMENTS 5,677,918 A * 10/1997 Tran ...................... H04L 1/0083
370/321
6,567,388 B1 * 5/2003 Tomcik ................. H04L 1/1854
370/335
(Continued)

OTHER PUBLICATIONS

French Preliminary Report for Application No. FR 1250014 dated Sep. 17, 2012.
(Continued)

*Primary Examiner* — Thai Hoang
(74) *Attorney, Agent, or Firm* — Lerner, David, Littenberg, Krumholz & Mentlik, LLP

(57) ABSTRACT

The invention relates to a transmission control method of a set of transmitter/receiver systems of a local network comprising N transmitter/receiver systems wishing to transmit at least one data packet via the wireless local network, each transmitter/receiver system wishing to transmit said at least one data packet after a contention period during which a transmitter/receiver is or is not authorized to transmit the data packet of said transmitter/receiver, the method being characterized in that the contention period is broken down into R consecutive contention windows where R≥1, each contention window being broken down into K intervals of equal duration θ followed by an interval of duration δ, each contention window corresponding to a round r of contention;
(Continued)

Figure 1:
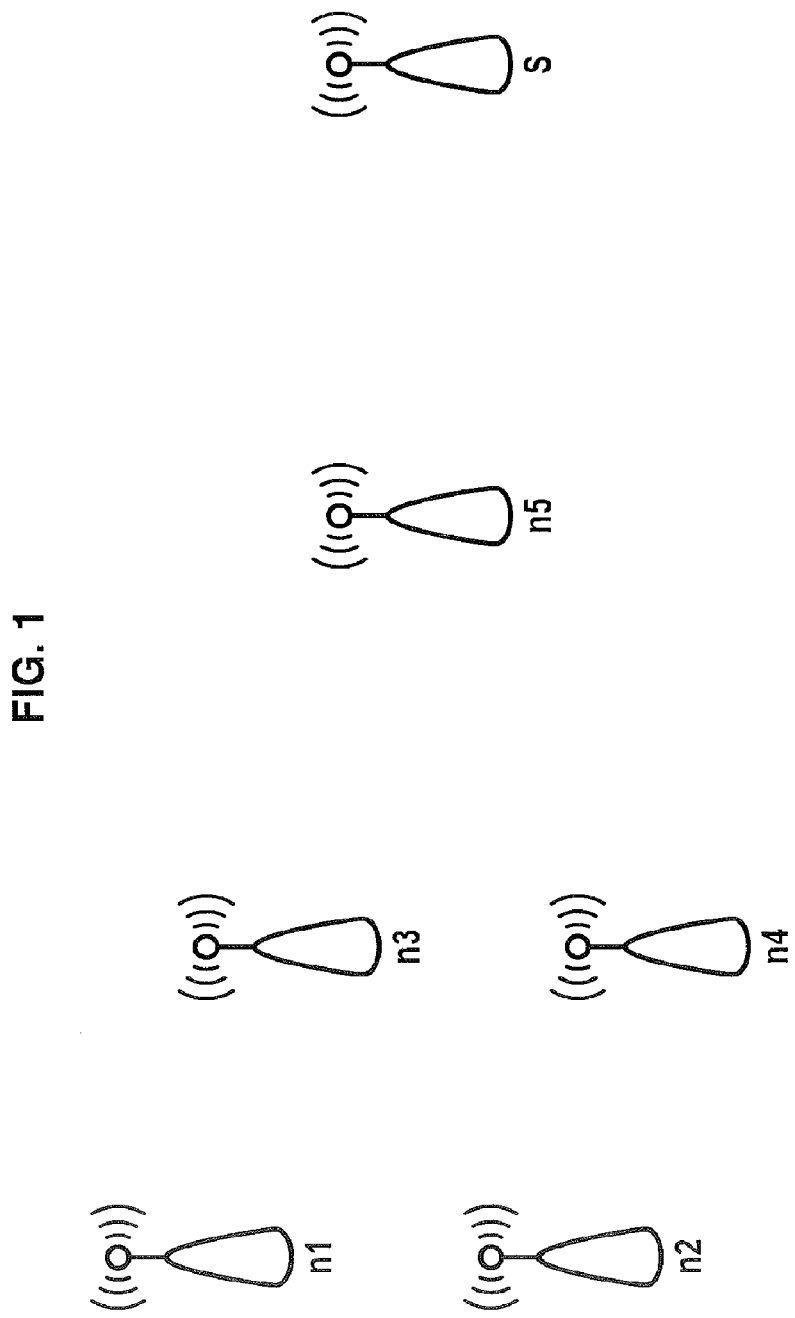

and in that the method comprises a step of determining the number K of intervals and the number R of contention windows, on the basis of the number N of transmitter/receiver systems wishing to transmit at least one data packet via the wireless local network.

13 Claims, 4 Drawing Sheets

(51) Int. Cl.
*H04J 3/00* (2006.01)
*H04W 74/08* (2009.01)
*H04W 52/02* (2009.01)
*H04W 84/18* (2009.01)

(58) Field of Classification Search
USPC ........ 370/328, 330, 337, 346–347, 449–462, 370/229–238
See application file for complete search history.

(56) References Cited

U.S. PATENT DOCUMENTS

| | | | | |
|---|---|---|---|---|
| 6,618,363 | B1* | 9/2003 | Bahl | H04N 21/234354 348/385.1 |
| 7,016,948 | B1* | 3/2006 | Yildiz | H04W 24/08 709/221 |
| 7,359,344 | B1* | 4/2008 | Cheng | H04B 7/18589 370/321 |
| 8,837,435 | B2* | 9/2014 | Singh | H04W 74/0816 370/335 |
| 2006/0215617 | A1* | 9/2006 | Martin | H04B 7/212 370/337 |
| 2013/0064151 | A1* | 3/2013 | Mujtaba | H04B 7/0817 370/311 |
| 2016/0014046 | A1* | 1/2016 | Reveman | H04L 12/4035 370/392 |

OTHER PUBLICATIONS

International Search Report and Written Opinion for Application No. PCT/EP2013/050012 dated Mar. 15, 2013.

Jun LV et al: "A Novel Adaptively Dynamic Tuning of the Contention Window (CW) for Distributed Coordination Function in IEEE 802.11 Ad hoc Networks", Convergence Information Technology, 2007, International Conference on, IEEE, Piscataway, NJ, USA, Nov. 21, 2007, pp. 290-294, XP031225219.

Pountourakis I E et al: "Stability and throughput optimization of multichannel slotted non-persistent CSMA protocol", Computer Communications, Elsevier Science Publishers BV, Amsterdam, NL, vol. 18, No. 12, Dec. 1, 1995, pp. 949-958, XP004032426.

Seok-Won Kang et al: "A Novel Estimation-Based Backoff Algorithm in the IEEE 802.11 Based Wireless Network", Consumer Communications and Networking Conference (CCNC), 2010 7th IEEE, IEEE, Piscataway, NJ, USA, Jan. 9, 2010, pp. 1-5, XP031642810.

* cited by examiner

_(1)_

METHOD FOR ACCESSING A TRANSMISSION CHANNEL IN A WIRELESS COMMUNICATION NETWORK WITH A CONTENTION WINDOW

GENERAL TECHNICAL FIELD

The invention concerns the field of wireless telecommunication networks, in particular ad hoc networks of sensor network type.

STATE OF THE ART

A Wireless Sensor Network is an ad hoc wireless communication network composed of nodes which are low-powered wireless transmitter/receiver systems capable of transmitting data towards a data sink.

In recent years such networks have aroused much interest in applications for which data collecting is needed, and in any area. For example this may be data enabling the tracking of environment-related data, the surveillance of industrial processes, preventive surveillance, home surveillance, traffic control, emergencies, military surveillance, agriculture, the monitoring of fauna, etc.

Unlike conventional networks and contrary to traditional networks, a sensor network has its own design and resource constraints such as amount of energy (battery), short communication range, low bit rate, limited processing and storage at each node thereof.

In said network, each node wishes to transmit a data packet towards a data sink.

The transmitting of packets in this type of network is guided by standards IEEE 801.11, IEEE 802.15.4 and IEEE 802.16.

Under these standards, the management of access of the nodes to the transmission channel may be based on an access mode using contention to access the transmission channel via a contention window (CW) having K slots of duration v.

The principle of such access is the following.

Before transmitting, a node verifies that the transmission channel is free.

To do so, each node chooses a random instant for accessing the channel inside the contention window (probability of successful access to the transmission channel).

One objective of access management to the channel via contention is to obtain the high probability that only a single node transmits a data packet on the transmission channel at a given instant.

When a node wishes to transmit a data packet on the transmission channel it draws a random number k between 0 and K−1 which will be used as countdown for transmitting a Request To Send (RTS) packet containing the identifier of the transmitting and receiving nodes and details on the data to be transmitted such as the amount of data and data type.

The node then waits for a time kv (Channel Sensing (CS) phase) and on expiry of the time kv if the channel is available i.e. no other node is in the progress of transmitting its packet, it transmits its RTS packet or otherwise waits for the next cycle.

Under these standards the size of the window is variable and is between two values $K_{min}$ and $K_{max}$, these values being set by the standards. The size of the contention window is modified after each transmission. For example it is doubled between each cycle to reduce the probability of collision between packets sent by different nodes.

Once the RTS packet is received by the receiver the latter replies with an Acknowledgment packet (ACK). Once this ACK packet is received the RTS-transmitting node is able to send its data. Immediately after receiving the data the receiver can confirm receipt thereof with a new ACK message.

Said access management however leads to wastage of the resources of each node, energy resources in particular.

A node is often in idle listening mode. In addition whenever a node receives a packet it is not destined to receive, energy is wasted by overhearing.

The problem to be solved is to organise access to the transmission channel in efficient manner for the purpose of extending the lifetime of the network.

DESCRIPTION OF THE INVENTION

The invention sets out to overcome at least one of the aforementioned drawbacks.

For this purpose, the invention proposes a method for controlling the transmission by a set of transmitter/receiver systems in a local network comprising N transmitter/receiver systems wishing to transmit at least one data packet via the local wireless network, each transmitter/receiver system wishing to transmit the said at least one data packet after a contention period during which a transmitter/receiver is or is not authorised to transmit its data packet, the method being characterized in that the contention period is broken down into R consecutive contention windows R≥1, each contention window being divided into K equal slots of duration θ followed by a slot of duration δ, each contention window corresponding to a round r of contention; and in that the method comprises a determination step, as a function of the number N of transmitter/receiver systems wishing to transmit at least one data packet via the local wireless network, to determine the number of slots K and the number R of contention windows.

The invention is advantageously completed by the following characteristics taken alone or in any technically possible combination thereof:

- the determination of the number of slots K and of the number R of contention windows consists of allocating to the transmitter/receiver systems a participation probability $P_p$ translating the probability of whether or not obtaining authorisation to transmit their data packet during the contention period;
- the determination of the number of slots K and of the number R of contention windows consists of iteratively testing several values of the number of slots K together with a participation probability $P_p$ translating the probability of whether or not obtaining authorisation to transmit a data packet during the contention period in the following manner:
  a) defining a value of a participation probability $P_p$;
  b) defining the number of slots K in the size of the contention window;
  c) determining a probability of success $P_\alpha$ as a function of the number N of nodes in the wireless communication network wishing to transmit a data packet as a function of the size K of the contention window, and participation probability $P_p$, the probability of success $P_\alpha$ translating successful transmission of the data packet during a round r of contention;
  d) repeating steps a) to c) until $P_\alpha$>threshold with the threshold value being previously fixed.
- the size K of the contention window also entails:
  e) determining, for several values of the number of rounds r of contention, a probability $P_\beta$ according to which a transmitter/receiver will successfully transmit its data packet after the contention period, the said probability $P_\beta$ depending on probability $P_\alpha$ obtained at step d);

f) repeating step e) until $P_\beta$>threshold is obtained, with the threshold value being determined in advance.

the probability $P_\beta$ is defined by the following operating function: $P_\beta = \sum_{r=1}^{R} P_\alpha (1-P_\alpha)^{(r-1)}$.

the probability $P\alpha$ is defined by the following operating function:

$$P_\alpha = \sum_{k=1}^{K} P_p \cdot N \cdot \frac{k}{K} \cdot \left(1 - \frac{k}{K}\right)^{(N-1) \cdot P_p}.$$

to determine whether a transmitter/receiver will or will not be authorised to transmit its data packet, each transmitter/receiver at each contention round:

a) draws a random number k between 0 and K−1;
b) waits a period proportional to the random number K·θ before transmitting a request to send data on the channel;
c) receives authorisation to transmit or an indication that the channel is busy;
d) transmits its data packet if it has received authorisation to transmit, or does not transmit its data packet.

the participation probability $P_p$ is obtained from a Lookup table comprising several values of participation probability as a function of several values of the number N of transmitter/receiver systems in the communication network.

the threshold value is between 85% and 95%.

The invention further proposes a device for accessing a wireless communication network of a communication node of a wireless communication network, comprising means to implement a method according to the first aspect of the invention.

The invention is based on the fact that each node wishes to transmit a data packet after a contention period. The contention period pairs the known principle of a contention window with a principle of successive rounds of contention. The period of contention has the duration determined by the application.

With said pairing it is possible to increase the probability of successful access to the transmission channel.

In addition, since the number of slots of the contention window is optimised in relation to the density of the network, the energy consumption of each node needed for sensing the channel is limited.

PRESENTATION OF THE FIGURES

Figure 2:
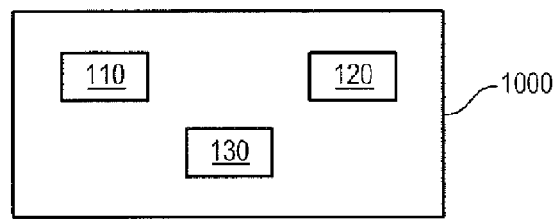
Figure 3:
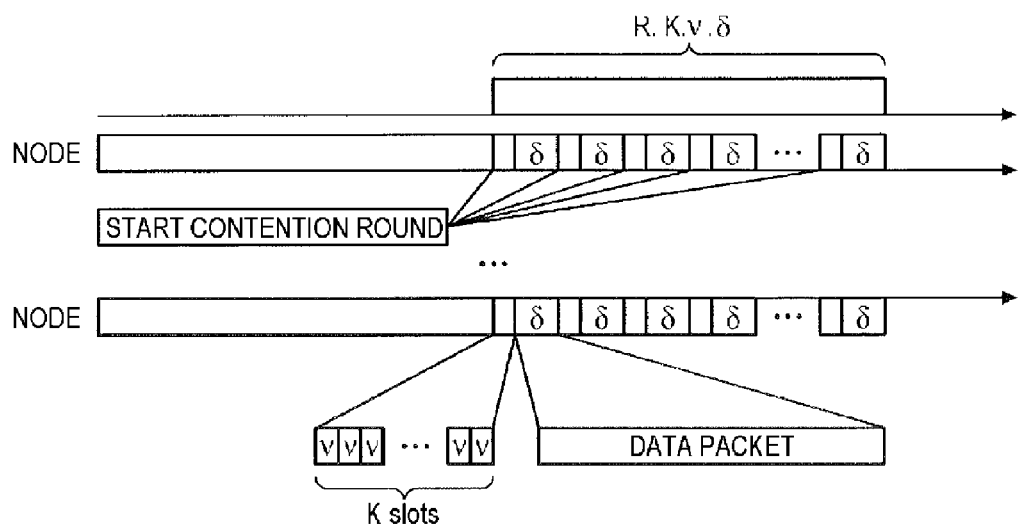
Figure 5:
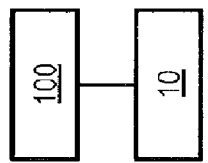
Figure 4:
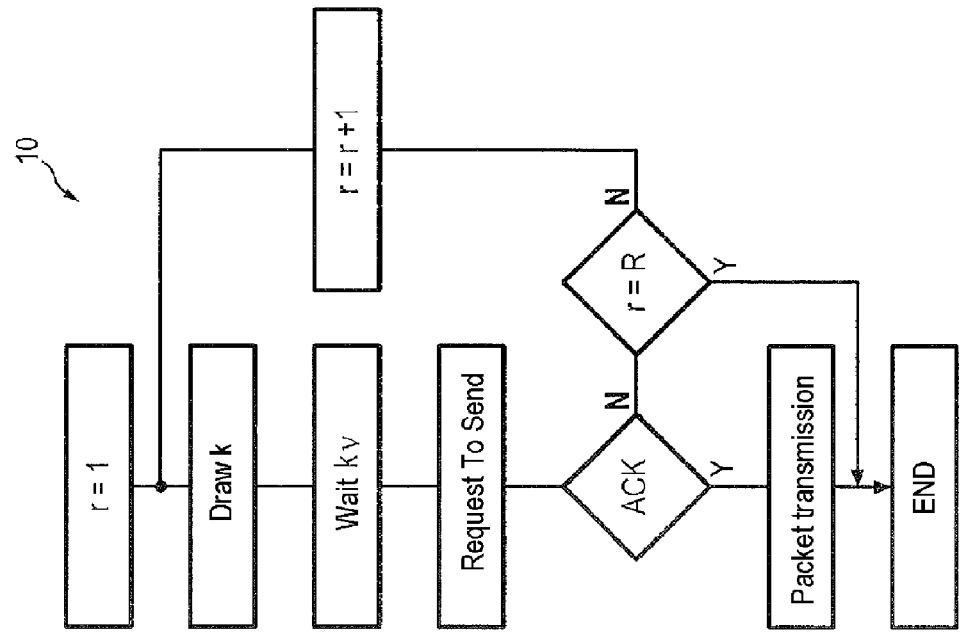
Figure 7:
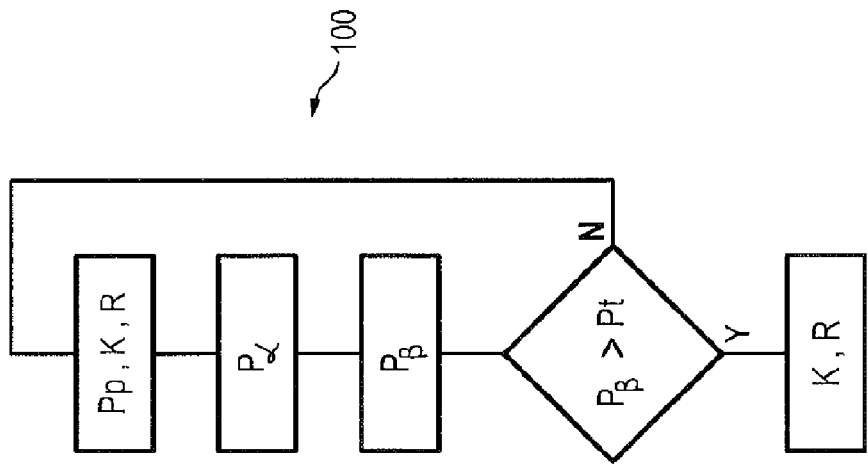
Figure 6:
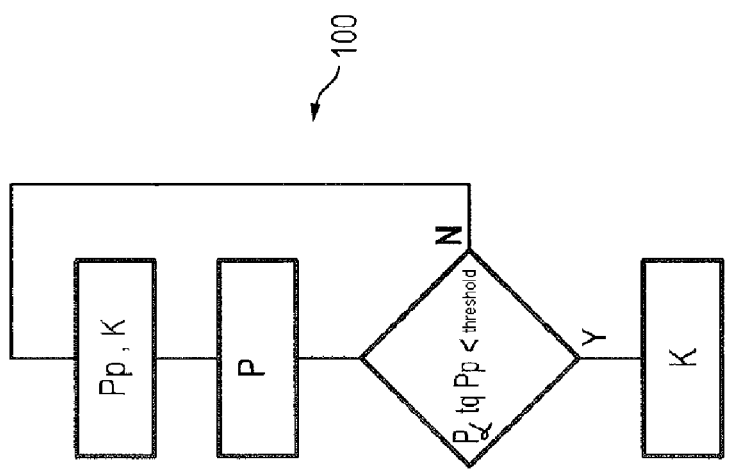

Other characteristics and advantages of the invention will become further apparent from the following non-limiting description given solely for illustration purposes and is to be read with reference to the appended drawings in which:

FIG. 1 illustrates a communication network;
FIG. 2 illustrates a device for accessing the communication network by each node of the network;
FIG. 3 illustrates traffic management via a contention window according to one embodiment of the invention,
FIG. 4 illustrates steps of a method for accessing the communication network according to the invention;
FIG. 5 illustrates steps of a method according to one embodiment of the invention,
FIG. 6 illustrates steps of a method according to one embodiment of the invention,
FIG. 7 illustrates steps of a method according to one embodiment of the invention.

DETAILED DESCRIPTION OF THE INVENTION

The case is taken here of a sensor network. Evidently the method described below can be applied to any system in which transmitter/receiver systems wish to transmit a data packet on the same transmission channel.

FIG. 1 illustrates a sensor network N comprising five nodes n1, n2, n3, n4, n5 and a data sink S. A node is a transmitter/receiver system.

Each node comprises a device for accessing the wireless communication network in which a method for accessing the wireless communication network is implemented in a processor thereof.

FIG. 2 illustrates a device 1000 for accessing the communication network. Said device comprises a processor 110, a module 120 to access the network for transmitting and receiving data packets, and a memory 130.

It is considered that all the nodes wishing to transmit a data packet simultaneously use a method for accessing the wireless communication network without mutual polling.

It is specified here that each node of the communication network has knowledge of the density of the network.

This density can be obtained for example using an estimation method during initialisation of the sensor network, or it can be transmitted to each node via the data sink. Other techniques known to persons skilled in the art can be used for this purpose. These techniques will not be detailed in the remainder hereof.

This method is described for one node of the communication network.

FIG. 3 illustrates the time structure of several rounds of contention and FIG. 4 illustrates steps of a method for accessing the communication network according to one embodiment of the invention.

It is specified here that the nodes of the communication network are synchronised i.e. they start the contention phase at the same time.

A node of the network wishes to transmit a data packet on the transmission channel to the data sink S.

To do so, the node has a contention period broken down into R≥1 consecutive contention windows R, each contention window being divided into K equal slots of duration θ followed by a slot of duration δ, each contention window corresponding to a round r of contention. The slot of duration δ is the duration provided so that a node which has received authorisation to transmit a packet is effectively able to transmit this packet.

In other words, a node wishing to transmit a data packet on the communication channel will have this contention period for successful transmission of its data packet. It is in particular during this period that scheduling for transmission of packets by one or more nodes of the network will be carried out. It relates to controlled transmitting of a data packet by one or more nodes of the local wireless network via this local wireless network.

At each contention round r the node draws a random number between 0 and K−1 where K is the size of the contention window in number of slots.

The node then waits a time k·θ (where θ is the duration of a slot) after which it first verifies that the transmission channel is not busy. To do so it transmits a Request to Send (RTS). If it receives positive acknowledgement (ACK) it transmits its data packet. It has a time period δ to transmit its data packet.

On the other hand, if the node does not receive positive acknowledgement, it will wait for the following round of contention to start over again.

Finally, if the maximum number of contention rounds r=R is reached the node can assume that the receiver of the RTS is not within communication range and will change to idle mode until the next contention phase.

It is one objective of controlled transmission to optimise—to determine—parameters of the contention period. In particular the purpose, as a function of the number N of transmitter/receiver systems wishing to transmit at least one data packet via the local wireless network, is to determine the number of slots K and the number R of contention windows in the contention period.

To optimise these parameters a step 100 is performed to determine the size K of the contention window and the number R of contention windows in the contention period.

FIG. 5 schematically illustrates steps of such optimisation.

The size K and number R of contention windows in the contention period will be optimised as a function of the density N of the wireless communication network. In other words, these parameters depend on the number N of nodes competing to transmit a data packet on the channel. They relate to the number of active nodes in the network.

A description is given below of several embodiments to optimise the size K of the contention window.

It is noted that in these embodiments the size of the window K is not necessarily the same depending on the node under consideration. On the other hand, the number R of contention windows in the contention period is identical for each competing node.

1<sup>st</sup> Embodiment

FIG. 6 schematically illustrates steps of this embodiment.

According to a first embodiment there is only one round of contention (i.e. R=1), in this case only the size K of the contention window is determined.

Said determination is dependent on each node's participation probability $P_p$ translating the probability of whether or not obtaining authorisation to transmit its data packet during the contention period.

If each node which participates in the contention (the total number of participants in contention is N) draws a random number between 0 and K−1, the probability of successfully transmitting its RTS during a round of contention r is $P_\alpha$ which is advantageously defined by the followina operating function:

$$P_\alpha = \sum_{k=1}^{K} P_p \cdot N \cdot \frac{k}{K} \cdot \left(1 - \frac{k}{K}\right)^{(N-1) \cdot P_p},$$

where $P_p$ is the participation probability.

According to this embodiment, several values of participation probability $P_\alpha$ together with the size K of the contention window will be iteratively tested until verification of the constraint $P_\alpha$>threshold where the threshold value is fixed in advance.

The threshold value is determined by the given application and is typically between 85% and 95%.

In other words, a node wishing to transmit performs the following steps at the start of each contention period:
 a) defines a value of a participation probability $P_p$ with a given K;
 b) defines a value K of the size of the contention window;
 c) determines probability $P_\alpha$; and
 d) repeats steps a)-c) until $P_\alpha$>threshold, the threshold value being fixed in advance (e.g. 95%).[1]

[1] erreur dans puces qui devaient lire a) b) c) d). Voir revendication 3.

2<sup>nd</sup> Embodiment

FIG. 7 schematically illustrates steps of this embodiment.

According to this embodiment there are several rounds of contention (R≥1), each node determines the size K of the contention window together with the number R of contention rounds and the participation probability $P_p$.

The size K is iteratively determined as a function of the probability $P_\alpha$ for each round R. The objective is to obtain transmitting by the greatest possible number of transmitters and hence to maximise R. For this purpose each node calculates $P_\beta$ which corresponds to the event; a node successfully transmits a data packet in R rounds of contention i.e. after the contention period.

The probability $P_\beta$ is advantageously defined by the following operating function:

$$P_\beta = \Sigma_{r=1}^{R} P_\alpha (1-P_\alpha)^{(r-1)},$$

where $P_\alpha$ is as defined in the first embodiment and R is the number of rounds of contention.

According to this embodiment, the determination of the size K of the window consists of iteratively testing several values of size K together with several values of participation probability $P_p$, and a number R of rounds of contention.

It is noted that in this embodiment the steps of the first embodiment are carried out.

The values of size K, R and participation probability $P_p$ are those which verify the constraint $P_\beta$>threshold where threshold is defined in advance and is application-dependent.

3<sup>rd</sup> Embodiment

Additionally, for each of the two embodiments described above the values of the different probabilities can be found in Look-up Tables (LUTs).

These Look-up Tables can be saved in the memory of each node's device to access the communication network, or can be periodically sent by the data sink S.

The invention claimed is:
1. A method for controlling transmission by a set of nodes in a local wireless network comprising N nodes wishing to transmit at least one data packet via the local wireless network after a contention period during which a node is authorised or is not authorised to transmit its data packet, said method comprising a step of determining parameters of the contention period, said parameters being a number of slots K and being a number of R≥1 successive contention windows each contention window being divided into K equal slots of duration θ followed by a slot of duration δ, each contention window corresponding to a round r of contention; and the parameters of the contention period being determined as a function of the number N of nodes wishing to transmit at least one data packet via the local wireless network; wherein the determination of the number of slots K and the number R of contention windows consists of iteratively testing several values of the number of the slots

K together with a participation probability $P_p$ translating a probability of whether or not obtaining authorisation to transmit its data packet during the contention period in the following manner;
(a) defining a value of a participation probability $P_p$;
(b) defining the number K of slots in the size of the contention window;
(c) determining the probability of success $P_\alpha$ as a function of the number N of nodes in the wireless communication network wishing to transmit a data packet, the size K of the contention window and the participation probability $P_p$, the probability of success $P_\alpha$ translating successful transmission of the data packet during a round r of contention;
(d) repeating steps (a) to (c) until $P_\alpha$>threshold with the threshold value being fixed in advance.

2. The method according to claim 1, wherein the determination of the number of slots K and the number R of contention windows consists of allocating to the nodes a participation probability $P_p$ translating the probability of whether or not obtaining authorisation to transmit their data packet during the contention period.

3. The method according to claim 2, wherein the participation probability $P_p$ derives from a Look-up Table comprising several values of participation probability as a function of several values of the number N of nodes in the communication network.

4. The method according to claim 1, wherein the size K of the contention window also comprises:
(e) determining, for several values of the number of rounds R of contention, a probability $P_\beta$ according to which a node will successfully transmit its data packet after the contention period, the said probability $P_\beta$ depending on probability $P_\alpha$ obtained at step (d);
(f) repeating step (e) until $P_\beta$>threshold is obtained, with the threshold value fixed in advance.

5. The method according to claim 4, wherein the probability $P_\beta$ is defined by the following operating function: $P_\beta = \sum_{r=1}^{R} P_\alpha (1-P_\alpha)^{(r-1)}$.

6. The method according to claim 1, wherein the probability $P_\alpha$ is defined by the following operating function:

$$P_\alpha = \sum_{k=1}^{K} P_p \cdot N \cdot \frac{k}{K} \cdot \left(1 - \frac{k}{K}\right)^{(N-1) \cdot P_p}.$$

7. The method according to claim h wherein to determine whether a transmitter/receiver will or will not be authorised to transmit its data packet, each node at each round of contention:
(a) draws a random number k between 0 and K−1;
(b) waits for a time proportional to the random number k·θ before transmitting a request to send data on the channel;
(c) receives authorisation to transmit or an indication according to which the channel is busy;
(d) transmits its data packet if it has received authorisation to transmit, or does not transmit its data packet.

8. The method according to claim 1 wherein the threshold value is between 85% and 95%.

9. The method according to claim 1, further comprising accessing a wireless communication network with a device coupled to a node of the wireless communication network.

10. The method according to claim 1, further comprising a device for accessing a wireless communication network using a node of the wireless communication network.

11. A system for controlling transmission, comprising:
a set of nodes in a local wireless network comprising N nodes wishing to transmit at least one data packet via the local wireless network after a contention period during which a node is authorised or is not authorised to transmit its data packet, each node configured to determine parameters of the contention period, said parameters being a number of slots K and being a number of R≥1 successive contention windows, each contention window being divided into K equal slots of duration 9 followed by a slot of duration δ, each contention window corresponding to a round r of contention; and the parameters of the contention period being determined as a function of the number N of nodes wishing to transmit at least one data packet via the local wireless network; wherein the determination of the number of slots K and the number R of contention windows consists of iteratively testing several values of the number of the slots K together with a participation probability $P_p$ translating a probability of whether or not obtaining authorisation to transmit its data packet during the contention period in the following manner;
(a) defining a value of a participation probability $P_p$;
(b) defining the number K of slots in the size of the contention window;
(c) determining the probability of success $P_\alpha$ as a function of the number N of nodes in the wireless communication network wishing to transmit a data packet, the size K of the contention window and the participation probability $P_p$, the probability of success $P_\alpha$ translating successful transmission of the data packet during a round r of contention;
(d) repeating steps (a) to (c) until $P_\alpha$>threshold with the threshold value being fixed in advance.

12. The system according to claim 11 wherein the probability $P_\alpha$ is defined by the following operating function:

$$P_\alpha = \sum_{k=1}^{K} P_p \cdot N \cdot \frac{k}{K} \cdot \left(1 - \frac{k}{K}\right)^{(N-1) \cdot P_p}.$$

13. The system according to claim 11 wherein the threshold value is between 85% and 95%.

* * * * *